United States Patent Office 3,631,194
Patented Dec. 28, 1971

3,631,194
METHOD OF PREPARING MERCAPTOALKYL ALKOXY SILANES
Gary E. Le Grow, Midland, Mich., assignor to Dow Corning Corporation, Midland, Mich.
No Drawing. Continuation-in-part of application Ser. No. 847,407, Aug. 4, 1969. This application Apr. 23, 1970, Ser. No. 31,348
Int. Cl. C07f 7/02, 7/04
U.S. Cl. 260—448.2 E  9 Claims

ABSTRACT OF THE DISCLOSURE

Isothiuronium salts of the formula $$Cl^-(NH_2)_2{}^+CSR'''SiR'_x(OR)_{3-x}$$

where R''' is —CH$_2$— or —CH$_2$CH$_2$—, are reacted with ammonia in monohydric alcohol solvent under anhydrous conditions to give excellent yields of HSR'''SiR$_x$(OR)$_{3-x}$. The latter are used as coupling agents between siliceous substrates and diene resins. For example, $$Cl^-(NH_2)_2{}^+CSCH_2Si(OCH_3)_3$$

in methanol gives HSCH$_2$Si(OCH$_3$)$_3$.

---

This application is a continuation-in-part of applicant's copending application Ser. No. 847,407, filed Aug. 4, 1969 and now abandoned, entitled "Method of Preparing Mercaptomethyl Alkoxy Silanes."

Mercaptomethyl alkoxy silanes are highly desirable materials because they have functional groups on the silicon atom and a mercapto function which is much more reactive than mercapto groups further removed from the silicon. For example, the mercaptomethyl group is much more reactive than 2-mercaptoethyl or 3-mercaptopropyl. The combination of very reactive mercapto groups and silicon functional groups enables one to use the compositions made by the process of this invention in applications for which the mercaptomethyl siloxanes and tetrasubstituted silanes of U.S. Pat. 2,719,165, and the mercaptoethyl triethoxy silane of British Patent 791,609, are not suitable or are less efficient.

It is shown in U.S. Pat. 3,314,982, that mercapto alkyl silanes in which the sulfur atom is connected to the Si through at least 3 carbon atoms can be made by alkaline decomposition of the corresponding isothiuronium salts. However, this patent states, col. 1, that such a process is inoperative with isothiuronium salts of siloxanes in which the sulfur is on a carbon atom adjacent the silicon. Thus, the clear teaching of this patent is that alkali will cleave alpha-sulfur substituted silicon compounds which also have oxygen attached to the silicon. It is also known in organosilicon chemistry that the effect of oxygen on other substituents on silicon is essentially the same whether the oxygen is in the form of a siloxane linkage or an alkoxy group (i.e., for Si—O—Si and Si—O—C). On the bases of teaching of this patent one would expect that isothiuronium methyl salts of alkoxy silanes would also be cleaved under alkaline conditions.

It is also well known in the art as shown by Eaborn "Organosilicon Compounds," pages 133 and 134 that beta-elimination occurs when beta-chloro organosilicon compounds are exposed to alkali. Eaborn also states that the beta-halo compounds are even more susceptible to cleavage than the corresponding alpha-halo silanes or siloxanes. Thus, in view of the teaching of Pat. 3,314,982 one would fully expect the beta-thiuronium alkylsilanes to cleave under alkaline conditions with elimination of the sulfur containing substituent.

Applicant has found that isothiuronium salts of alkoxy silanes in which the sulfur is alpha and beta to the silicon, can be reacted under alkaline conditions to give excellent yields of the corresponding mercapto alkyl compounds by the method shown below.

It is the object of this invention to provide a commercially feasible method of preparing mercaptomethyl and mercaptoethyl alkoxy silanes.

In accordance with this invention silanes of the formula
(1) HSR'''SiR'$_x$(OR)$_{3-x}$ are prepared by reacting compounds of the formula (2)  $Cl^-(NR''_2)^+{}_2CSR'''SiR'_x(OR)_{3-x}$ with ammonia in a monohydric alcohol solvent under essentially anhydrous conditions, in compounds (1) and (2), R''' is —CH$_2$— or —CH$_2$CH$_2$—, R' is a monovalent hydrocarbon radical free of aliphatic unsaturation or a R$_f$CH$_2$CH$_2$— radical in which R$_f$ is a perfluoroalkyl radical, R is a lower alkyl radical or a lower alkoxy alkyl radical, x is an integer from 0 to 2, and R'' is H or a methyl radical.

In carrying out this reaction the isothiuronium salt is dissolved in the alcohol. The amount of alcohol is not critical, but the reaction goes best when there is sufficient alcohol to render the reaction mixture fluid. It has been found that 10 to 50% by weight solutions of the isothiuronium salt works well, although more alcohol can be used, if desired.

When ammonia is added to the solution, reaction takes place to give a guanidine hydrochloride and the mercapto silane. The temperature of reaction is not critical.

The term "essentially anhydrous" means that the system is essentially free of water except for traces that may be incidental. Water causes cleavage of the mercapto methyl or mercaptoethyl group and its presence in gross amounts renders the process in operative, but amounts up to .1 weight percent in the solvent can be tolerated.

The reaction can be carried out in any monohydric alcohol in which the isothiuronium salt is soluble. These include alkanols such as methanol, ethanol or isopropanol, or alkanol ethers, such as the monomethyl ether of ethylene glycol, the monoethyl ether of diethylene glycol or the monomethyl ether of propylene glycol. It is desirable, but not essential that the alcohol correspond to the OR groups on the silicon.

As the reaction proceeds a layer of the guanidine salt settles to the bottom and can be separated with ease from the product layer. Analysis of the product showed that no cleavage takes place during the process of this invention.

The isothiuronium salts employed herein are made by reacting thiourea, tetramethyl thiourea or thioureas having both methyl radicals and hydrogen on the nitrogen with silanes of the formula ClR'''SiR'$_x$(OR)$_{3-x}$. This reaction can be carried out by heating a mixture of the reactants at 50 to 120° C. Obviously water should be kept out of the reaction. In the case of chloroethyl compounds the reaction should be carried out in the absence of a polar solvent.

The products made by the process of this invention are useful as coupling agents for diene resins such as butadienestyrene copolymers or polyisoprene and siliceous fillers such as clay or glass.

For the purpose of this invention R' can be any monovalent hydrocarbon radical free of aliphatic unsaturation such as alkyl radicals such as methyl, ethyl, isopropyl, hexyl, octadecyl or myricyl; cycloaliphatic radicals such as cyclopentyl, cyclohexyl or methylcyclohexyl; aryl hydrocarbon radicals such as phenyl, tolyl, xylyl, naphthyl, anthracyl or xenyl and aralkyl radicals such as benzyl, 2-phenylethyl or 2-phenylpropyl. R' can also be R$_f$CH$_2$CH$_2$— radical in which R$_f$ is a perfluoroalkyl radical such as perfluoromethyl, perfluoroethyl, perfluoroisobutyl, perfluorooctyl or perfluorooctadecyl.

R can be any lower alkyl radical such as methyl, ethyl, isopropyl or hexyl or any lower alkoxyalkyl radicals such as 2-methoxyethoxy, 2-ethoxyethoxy, 2-methoxypropyl, 2-butoxyethoxy or —$(CH_2CH_2O)_2CH_3$. The R groups on any one silicon can be the same or different.

The following examples are illustrative only and should not be construed as limiting the invention which is properly delineated in the appended claims.

EXAMPLE 1

A mixture of 539 g. of chloromethyl trimethoxy silane, 300 g. of thiourea and 80 g. of methanol was heated to about 80° C. with stirring. An exotherm took place to raise the temperature to 130° C. The mixture was cooled and 276 g. of methanol was added. Ammonia was then introduced and the temperature rose to 65° C. The addition of ammonia was continued until no further reaction took place. The liquid phase was decanted from the solid phase and was found by gas liquid chromatography to consist of methanol solvent and a single product. Distillation of the liquid gave mercaptomethyl trimethoxy silane in 85% yield. The properties were B.P. 74° C. at 10 mm., $n_4^{25}$ 1.4340 and $d_4^{25}$ 1.100.

EXAMPLE 2

A slurry of 30.4 g. (0.4 m.) of thiourea and 56.2 g. (0.33 m.) of 2-chloroethylmethyldimethoxysilane was heated at 105° C. for one hour. An exotherm occurred which was controlled by cooling so that the reaction temperature did not exceed 112° C. When the heat of reaction subsided the temperature was maintained at 105° C. for three hours. The iso-thiuronium salt was diluted with 374 g. of methanol. The formula of the salt $(CH_3O)_2Si(CH_3)(CH_2)_2SC(NH_2)_2Cl$ was determined by chloride ion titration and NMR spectrum.

Ammonia gas was added to the methanol solution and an exothermic reaction set in which raised the temperature to 65° C. The temperature was maintained at 70° C. by external heating and ammonia was added until no further reaction took place. The product phase was separated from the solid salt byproduct and distilled to give a 76% yield of beta-mercaptoethyl methyl dimethoxysilane, B.P. 56° C. at 2 mm. and $n_D^{25}$ of 1.4459. The structure was confirmed by the n.m.f. spectrum.

EXAMPLE 3

The following mercaptomethyl alkoxy silanes are obtained when the corresponding isothiuronium chlorides are reacted in the following alcohols in accordance with the procedure of Example 1.

| Alcohol: | Mercaptomethyl silane |
|---|---|
| Methanol | Mercaptomethyl methyl dimethoxy silane. |
| Do | Mercaptomethyl dimethyl methoxy silane. |
| Do | Mercaptomethyl phenyl dimethoxy silane. |
| Do | Mercaptomethyl octadecyl dimethoxy silane. |
| Do | Mercaptomethyl cyclohexyl dimethoxy silane. |
| Do | Mercaptomethyl 2-phenylpropyl dimethoxy silane. |
| Do | Mercaptomethyl 3,3,3-trifluoropropyl dimethoxy silane. |
| Ethanol | Mercaptomethyl triethoxy silane. |
| Isopropanol | Mercaptomethyl triisopropoxy silane. |
| 2-methoxyethanol | Mercaptomethyl tris(2-methoxyethoxy)silane. |
| Methanol | Mercaptomethyl dimethyl ethoxy silane. |

EXAMPLE 4

Equivalent results are obtained when the equivalent amount of tetramethyl thiourea is substituted for thiourea in the process of Example 1.

EXAMPLE 5

2-mercaptoethyl trimethoxy silane is obtained when 2-chloroethyl trimethoxy silane is substituted in the process of Example 2.

That which is claimed is:

1. The method comprising reacting a compound of the formula (1) $Cl^-(NR''_2)_2{}^+CSR'''SiR'_x(OR)_{3-x}$ with ammonia in a monohydric alcohol solvent under essentially anhydrous conditions whereby a compound of the formula (2) $HSR'''SiR'_x(OR)_{3-x}$ is obtained, in (1) and (2)

R''' is —$CH_2$— or —$CH_2CH_2$—,
    R'' is a methyl radical or a hydrogen atom,
    R' is a monovalent hydrocarbon radical free of aliphatic unsaturation or a $R_fCH_2CH_2$— radical in which $R_f$ is a perfluoroalkyl radical,
    R is a lower alkyl radical or a lower alkoxyalkyl radical and
    x is an integer from 0 to 2.

2. The method of claim 1 in which x is zero, R''' is —$CH_2$—, R is methyl and the alcohol is methanol.

3. The method of claim 1 in which x is 1, R''' is —$CH_2$—, R' and R are both methyl and the alcohol is methanol.

4. The method of claim 1 in which x is 2, R''' is —$CH_2$—, R' and R are both methyl and the alcohol is methanol.

5. The method of claim 1 in which R''' is —$CH_2CH_2$—.

6. The method of claim 1 in which R''' is —$CH_2CH_2$—, R and R' are both methyl and the alcohol is methanol.

7. The method of claim 1 in which R''' is —$CH_2CH_2$— and x is zero.

8. The method of claim 1 in which R''' is —$CH_2CH_2$— and x is 1.

9. The method of claim 1 in which R''' is —$CH_2CH_2$— and x is 2.

References Cited

UNITED STATES PATENTS 3,215,718  11/1965  Ryan _____ 260—448.2 E
3,314,982  4/1967  Koerner et al. ____ 260—448.2 N TOBIAS E. LEVOW, Primary Examiner W. F. W. BELLAMY, Assistant Examiner U.S. Cl. X.R.

260—448.8 R, 448.8 A, 448.2 N; 117—123